US009625797B2

(12) United States Patent
Tsuchiya et al.

(10) Patent No.: US 9,625,797 B2
(45) Date of Patent: Apr. 18, 2017

(54) PROJECTION OPTICAL DEVICE AND IMAGE PROJECTION APPARATUS

(71) Applicants: Satoshi Tsuchiya, Kanagawa (JP); Tetsuya Fujioka, Kanagawa (JP); Hideo Kanai, Tokyo (JP); Masamichi Yamada, Kanagawa (JP); Yasunari Mikutsu, Tokyo (JP); Naoyuki Ishikawa, Kanagawa (JP); Akihisa Mikawa, Kanagawa (JP); Yukimi Nishi, Tokyo (JP)

(72) Inventors: Satoshi Tsuchiya, Kanagawa (JP); Tetsuya Fujioka, Kanagawa (JP); Hideo Kanai, Tokyo (JP); Masamichi Yamada, Kanagawa (JP); Yasunari Mikutsu, Tokyo (JP); Naoyuki Ishikawa, Kanagawa (JP); Akihisa Mikawa, Kanagawa (JP); Yukimi Nishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 31 days.

(21) Appl. No.: 14/547,220

(22) Filed: Nov. 19, 2014

(65) Prior Publication Data
US 2015/0138514 A1 May 21, 2015

(30) Foreign Application Priority Data
Nov. 20, 2013 (JP) .................. 2013-239944

(51) Int. Cl.
*G03B 21/28* (2006.01)
*H04N 9/31* (2006.01)
(Continued)

(52) U.S. Cl.
CPC .......... *G03B 21/147* (2013.01); *G03B 21/28* (2013.01); *G03B 21/008* (2013.01); *G03B 21/142* (2013.01); *H04N 9/3141* (2013.01)

(58) Field of Classification Search
CPC ...... G03B 21/145; G03B 21/14; G03B 21/28; H04N 9/3141; G02B 13/16
(Continued)

(56) References Cited

U.S. PATENT DOCUMENTS

| 8,585,216 B2 * | 11/2013 | Ono ................. G03B 21/28 353/98 |
| 2006/0077572 A1 * | 4/2006 | Okorocha ............. G02B 7/021 359/819 |

(Continued)

FOREIGN PATENT DOCUMENTS

| JP | 10-260473 | 9/1998 |
| JP | 2005-182057 | 7/2005 |

(Continued)

*Primary Examiner* — William C Dowling
*Assistant Examiner* — Ryan Howard
(74) *Attorney, Agent, or Firm* — Harness, Dickey & Pierce, PLC (57) ABSTRACT

A projection optical device to project an image on a projection plane, includes a reflection mirror, a plurality of projection lenses, a projection lens supporting member to support the plurality of projection lenses, and a position-arrangement member provided at the projection lens supporting member to arrange the reflection mirror at a predefined position on the projection lens supporting member.

10 Claims, 11 Drawing Sheets

(51) Int. Cl.
*G03B 21/14* (2006.01)
*G03B 21/00* (2006.01)

(58) Field of Classification Search
USPC ......... 353/98, 99, 77, 78; 359/649, 650, 651
See application file for complete search history.

(56) References Cited

U.S. PATENT DOCUMENTS

| | | | |
|---|---|---|---|
| 2006/0170879 A1* | 8/2006 | Kato | G03B 21/10 |
| | | | 353/77 |
| 2006/0262284 A1* | 11/2006 | Onishi | G03B 21/10 |
| | | | 353/99 |
| 2011/0194035 A1* | 8/2011 | Aizawa | G02B 17/08 |
| | | | 348/744 |
| 2013/0070217 A1 | 3/2013 | Tatsuno | |
| 2013/0128234 A1 | 5/2013 | Fujioka et al. | |

FOREIGN PATENT DOCUMENTS

| | | |
|---|---|---|
| JP | 2006-322981 | 11/2006 |
| JP | 2008-191416 | 8/2008 |
| JP | 2011-186434 | 9/2011 |
| JP | 2013-064816 | 4/2013 |
| JP | 2013-109042 | 6/2013 |

\* cited by examiner

PROJECTION OPTICAL DEVICE AND IMAGE PROJECTION APPARATUS

CROSS-REFERENCE TO RELATED APPLICATIONS

This patent application is based on and claims priority pursuant to 35 U.S.C. §119 from Japanese Patent Application No. 2013-239944, filed on Nov. 20, 2013 in the Japan Patent Office, which is hereby incorporated by reference herein in its entirety.

BACKGROUND

Technical Field

Exemplary embodiments of the present disclosure generally relate to a projection optical device to project an image on a projection plane such as a screen, and an image projection apparatus having the same.

Description of the Related Art

Image projection apparatuses that project an image on a projection plane such as a screen are known. The image projection apparatus is provided with an image generator that forms an image based on image data received from a personal computer, video camera, or the like, with light emitted from a light source. The image generated with the image generator is projected on the projection plane via a projection optical device in which the image passes through a group of projection lenses and is reflected with multiple mirrors.

SUMMARY

In view of the foregoing, in an aspect of this disclosure, there is provided a novel projection optical device to project an image on a projection plane, including a reflection mirror, a plurality of projection lenses, a projection lens supporting member to support the plurality of projection lenses, and a position-arrangement member provided at the projection lens supporting member to arrange the reflection mirror at a predefined position on the projection lens supporting member.

These and other aspects, features, and advantages will be more fully apparent from the following detailed description of illustrative embodiments, the accompanying drawings, and associated claims.

BRIEF DESCRIPTION OF THE DRAWINGS

The aforementioned and other aspects, features, and advantages of the present disclosure will be better understood by reference to the following detailed description when considered in connection with the accompanying drawings, wherein.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

Hereinafter, exemplary embodiments of the present invention are described in detail with reference to the drawings. However, the present invention is not limited to the exemplary embodiments described below, but may be modified and improved within the scope of the present disclosure.

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

In a later-described comparative example, illustrative embodiment, and alternative example, for the sake of simplicity, the same reference numerals will be given to constituent elements such as parts and materials having the same functions, and redundant descriptions thereof omitted.

There is provided a novel projection optical device and an image projection apparatus in which a generation of trapezoidal distortion of an image projected on a projection plane or a generation of vignetting is suppressed.

The following is a description of an overall configuration of the image projection apparatus that may be provided with a light-receiving device according to an embodiment of the present invention.

Figure 1:
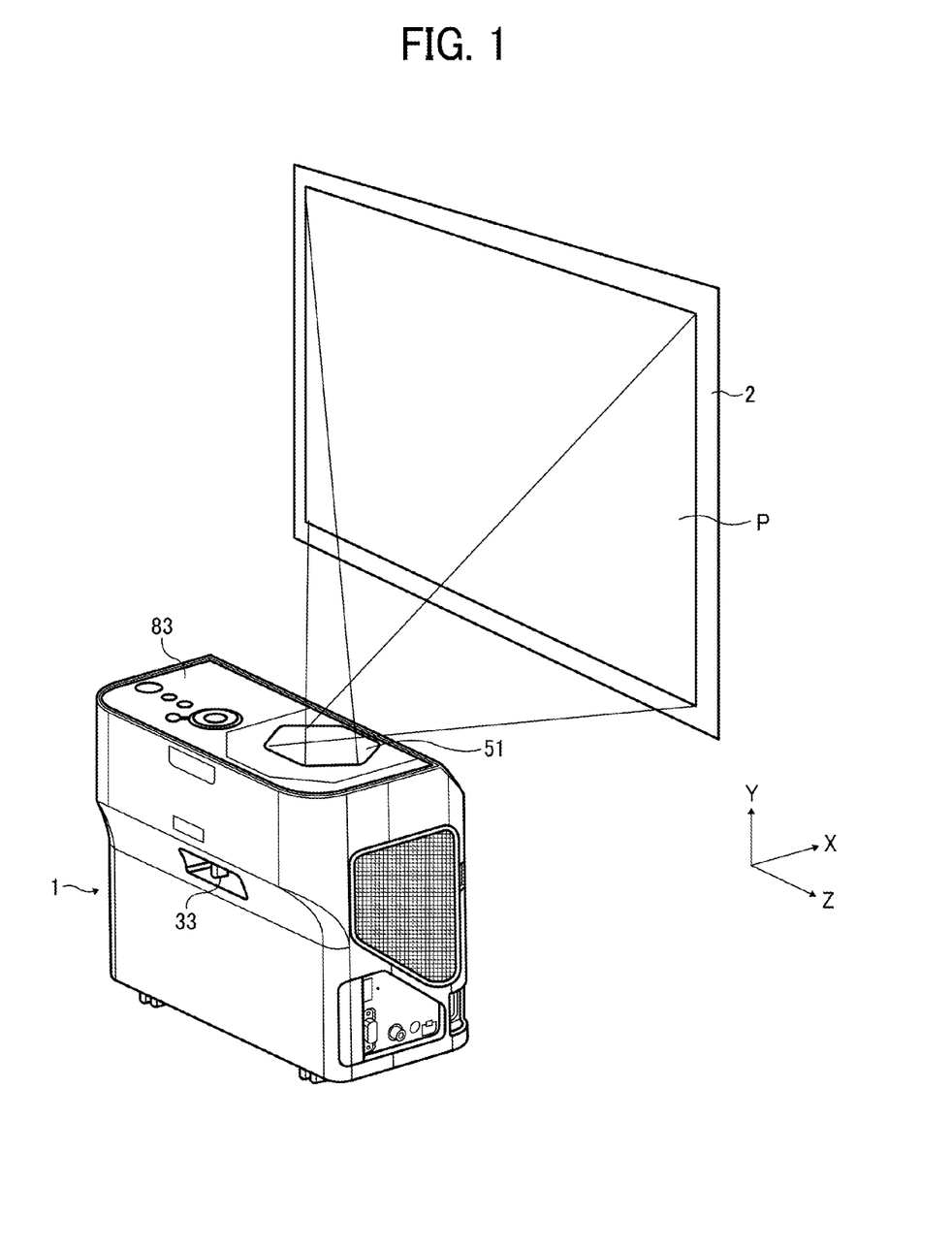
FIG. 1 is an external perspective view of a projector as an example of an image projection apparatus according to an embodiment of the present invention, and a projection plane.

FIG. 1 is an external perspective view of a projector 1 as an example of an image projection apparatus according to an embodiment of the present invention, and a projection plane 2 such as a screen. In the following description, as illustrated in FIG. 1, a normal direction of the projection plane 2 is defined as an X-direction, a direction (a vertical direction) of a minor axis of the projection plane 2 is defined as a Y-direction, and a direction (a horizontal direction) of a major axis of the projection plane 2 is defined as a Z-direction.

The projector 1 forms an image to be projected as a projection image P based on image data input from a personal computer, a video camera, or the like, and projects the projection image P on the projection plane 2 such as the screen. The projector 1 is small and lightweight, and employs a digital micro-mirror device 12 (hereinafter referred to as DMD) serving as a micro-drive mirror device.

It is to be noted that with respect to a liquid crystal projector, due to recent advancements in obtaining high resolution of a liquid crystal panel, obtaining improved brightness of a light source (e.g., lamp) accompanying advancement in efficiency of the light source, cost reduction are progressing. Further, a small light projector using a digital micro-mirror device (DMD) as a micro drive mirror device is in widespread use, and the projector has come to be widely used even in homes as well as in offices and schools. In addition, with respect to a front-type projector, portability has improved, and has come to be used even in small meetings of several people. With respect to the front-type projector, there is a preference for enabling enlargement of a projection image on the projection plane (i.e., increase in area size of the projection image on the projection plane) while reducing "a projection space outside of the projector required by the projector" as much as possible.

The projector 1 according to an embodiment of the present invention has a configuration in which a transmissive optical system of projection lenses is set parallel to the projection plane 2, and light flux is projected and magnified with respect to the projection plane 2 with a free-form curved-face mirror after reflecting the light flux with a reflection mirror. With the configuration, an upright optical engine can be downsized.

A dust-proof glass 51 is provided on an upper surface of the projector 1. The light flux that passes through the dust-proof glass 51 is projected on the projection plane 2 to form the projection image P thereon. An operation unit 83 that allows a user to operate the projector 1 is also provided on the upper surface of the projector 1. At a side surface of the projector 1, a focus lever 33 to adjust focus is provided.

Figure 2A:
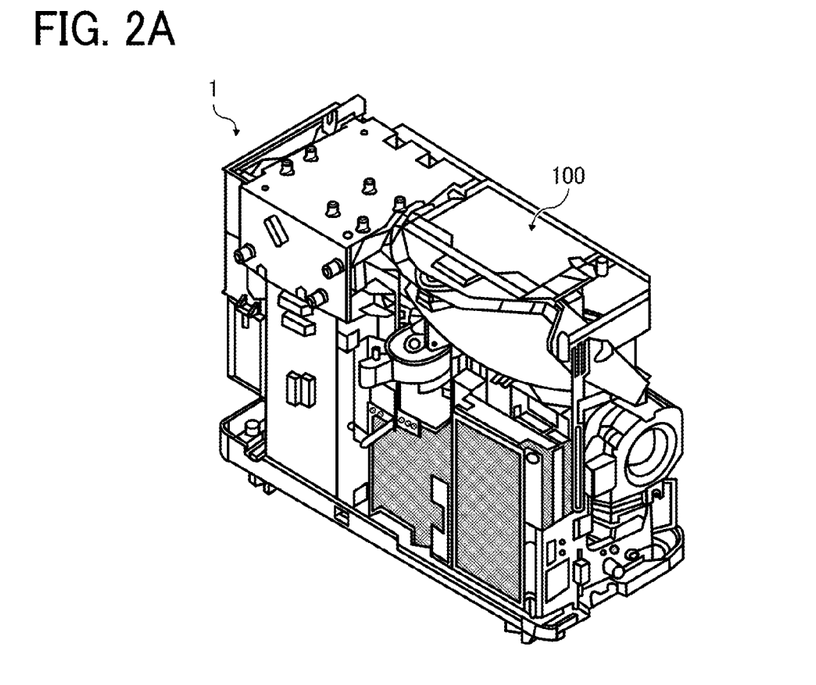
FIG. 2A is a perspective view of the inside of the projector viewed from a front side.
Figure 2B:
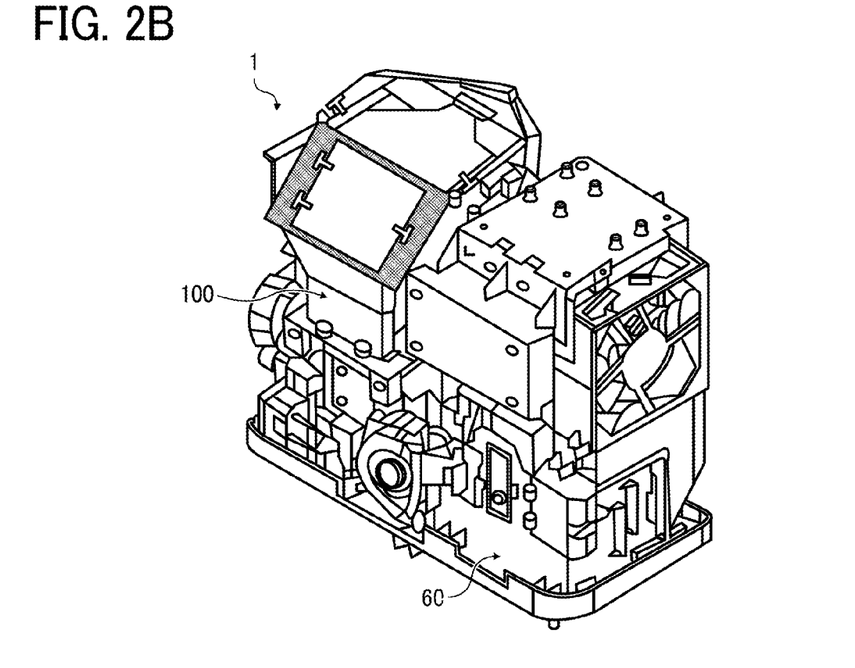
FIG. 2B is a perspective view of the inside of the projector viewed from a back side.
Figure 3:
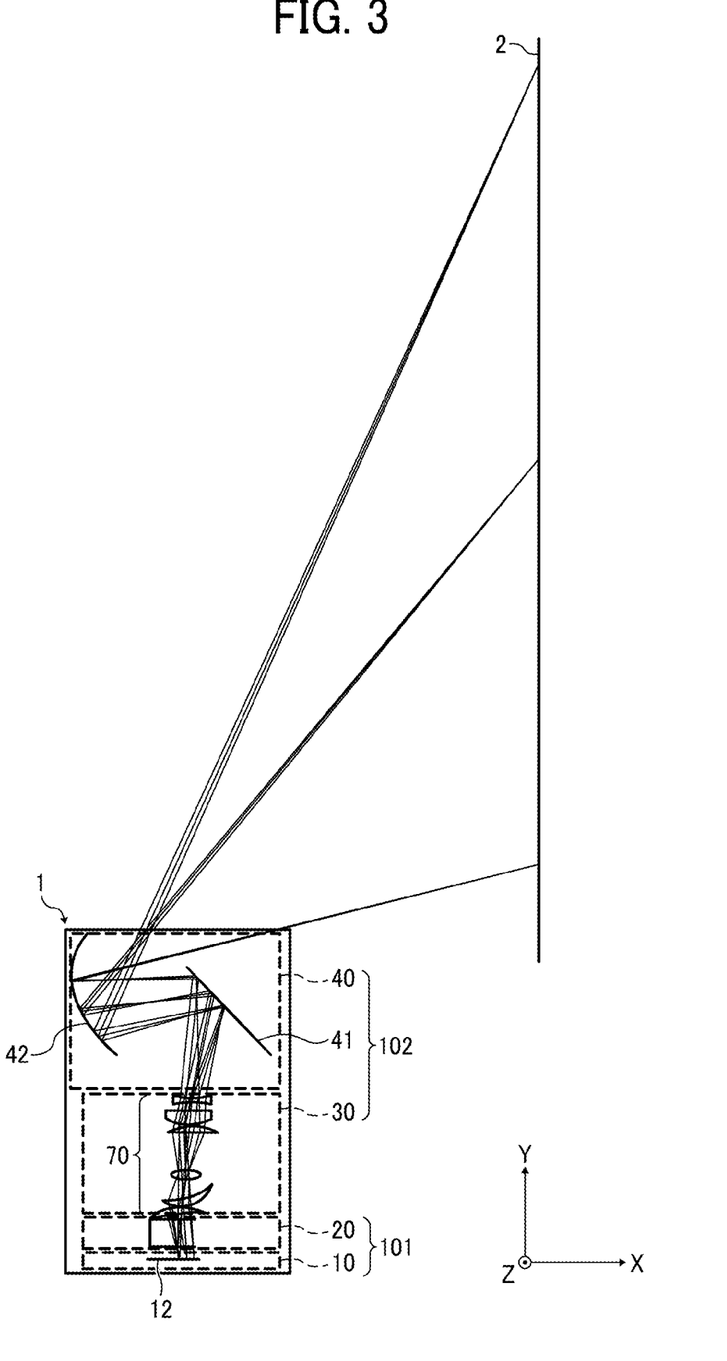
FIG. 3 is a diagram showing a light path from the projector to the projection plane.

FIG. 2A and FIG. 2B are a perspective view of the inside of the projector 1 with a main body cover of the projector 1 removed. FIG. 2A is a perspective view of the inside of the projector 1 viewed from a front side of FIG. 1. FIG. 2B is a perspective view of the inside of the projector 1 viewed from a back side of FIG. 1. FIG. 3 is a diagram showing a light path from the projector 1 to the projection plane 2.

The projector 1 includes an optical engine 100, and a light source unit 60 having a light source that emits a white light. The optical engine 100 includes an image forming unit 101 that forms the image to be projected as the projection image P using light from the light source, and a projection optical device 102 to project light flux of the image formed by the image forming unit 101 to the projection plane 2.

The image forming unit 101 includes a light modulator 10 provided with the DMD 12, and an illumination unit 20. The DMD 12 serving as the micro drive mirror device includes multiple micro mirrors that are movable so as to change the slope of a reflection face. The illumination unit 20 reflects light from the light source to the DMD 12.

The projection optical unit 102 is configured of a first projection optical unit 30, and a second projection optical unit 40. The first projection optical unit 30 includes at least one transmissive type refractive optical system and is provided with a first coaxial optical system 70 having positive power. The second projection optical unit 40 includes a reflection mirror 41 and a curved-face mirror 42 having positive power.

The DMD 12 generates the image to be projected as the projection image P by modulating light from the light source via the illumination unit 20. A light image serving as the projection image P generated by the DMD 12 is projected to the projection plane 2 via the first coaxial optical system 70 of the first projection optical unit 30 and the reflection mirror 41 and the curved-face mirror 42 of the second projection optical unit 40.

Figure 4:
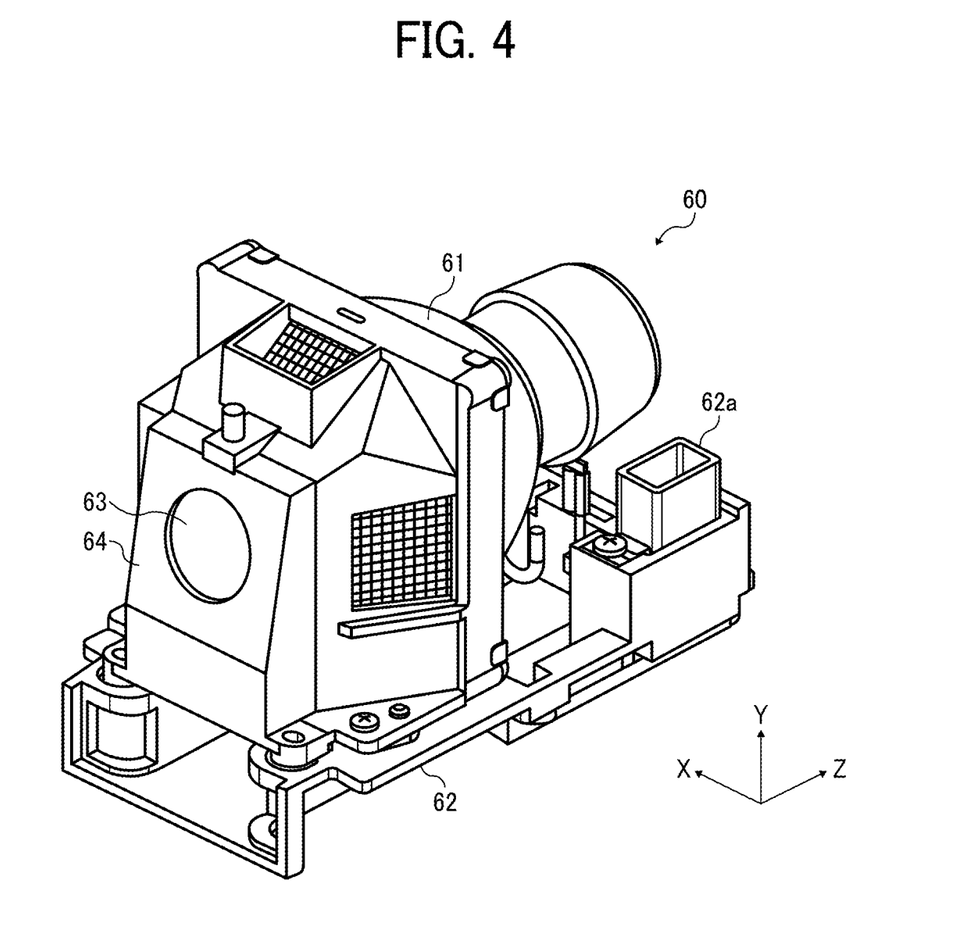
FIG. 4 is a perspective view of a light source unit.

FIG. 4 is a perspective view of the light source unit 60.

The light source unit 60 includes a light source 61 and a light source bracket 62. The light source 61 such as a halogen lamp, a metal-halide lamp, and a high pressure mercury lamp is provided on an upper surface of the light source bracket 62. The light source bracket 62 includes a connector 62a to connect to a power supply connector connected to a power supply unit. The connector 62a is provided at one end side of the horizontal direction (Z-direction) of the light source unit 60.

At a light emitting side (i.e., other end side of the horizontal direction of the light source unit 60) of the light source 61 on the upper surface of the light source bracket 62, a holder 64 serving as a supporting member to support a reflector is screwed to the light source bracket 62. At a face of the holder 64 of a side opposite to a side on which the light source 61 is provided, an emission window 63 is provided. Light emitted from the light source 61 is focused on the emission window 63 by the reflector supported by the holder 64. Accordingly, light is emitted from the emission window 63.

Figure 5:
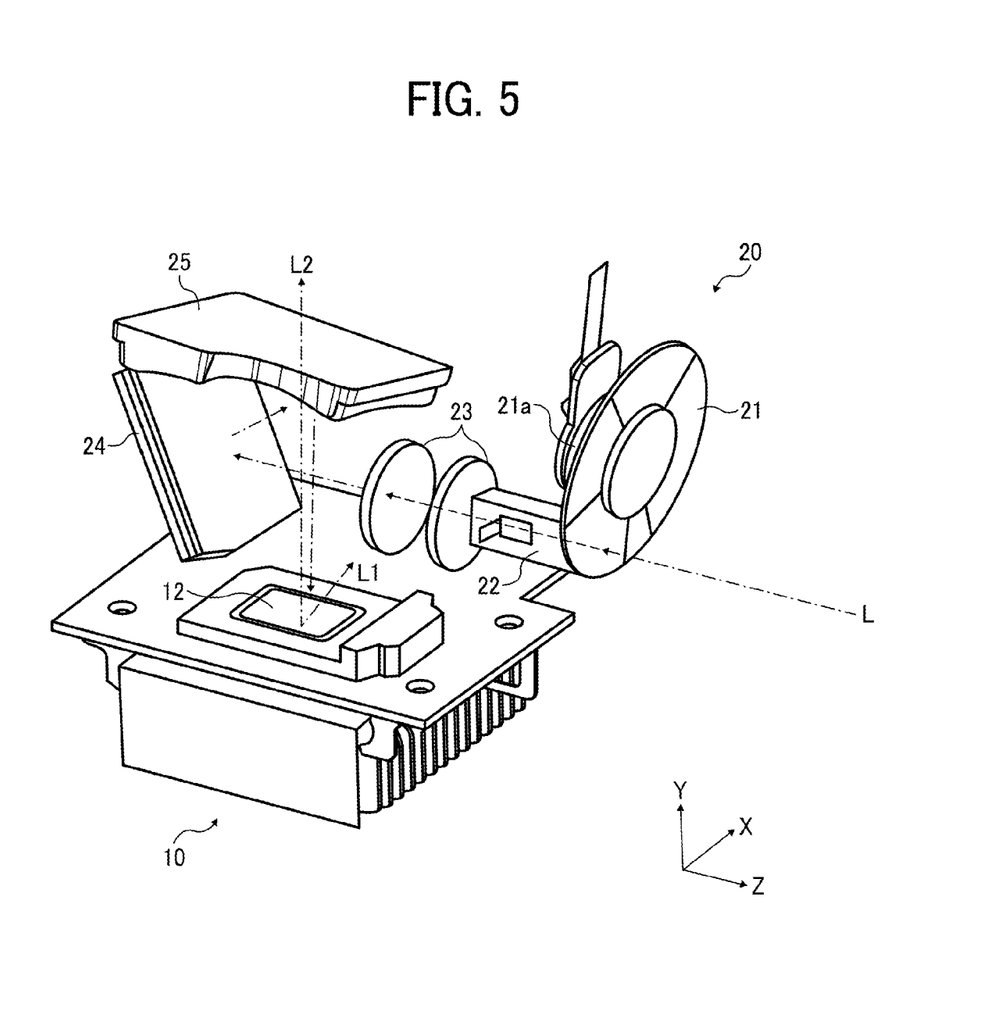
FIG. 5 is a diagram showing a light path within an illumination unit.

FIG. 5 is a diagram showing a light L path within the illumination unit 20.

The illumination unit 20 includes a color wheel 21, a light tunnel 22, two relay lenses 23, a cylinder mirror 24, and a concave-face mirror 25.

The color wheel 21 has a disk shape and is attached to a rotating member of a color motor 21a. On the color wheel 21, filters of red (R), green (G), and blue (B) are provided in a rotational direction. The light L emitted from the light source 61, which is focused on the emission window 63 by the reflector, passes through the emission window 63 and reaches a peripheral end portion of the color wheel 21. The light L reaching the peripheral end portion of the color wheel 21 is separated, in time-division, into light of R, G, and B by the rotation of the color wheel 21.

The light separated by the color wheel 21 enters the light tunnel 22. The light tunnel 22 has a rectangular box shape and an inner peripheral surface of the light tunnel 22 is a mirror surface. Incident light in the light tunnel 22 is formed into a uniform plane light source by being reflected a number of times by the inner peripheral surface of the light tunnel 22, and is emitted in the direction of the two relay lenses 23.

The light exiting the light tunnel 22 passes through the two relay lenses 23, is reflected by the cylinder mirror 24 and the concave-face mirror 25, and is focused on an image generation surface of the DMD 12 of the light modulator 10.

On the image generation surface of the DMD 12, multiple micro mirrors, which are movable, are arranged in a grid shape. Each of the micro mirrors is able to slope a respective mirror surface around a torsion axis at a predetermined angle and has two states of "ON" and "OFF". When the micro mirror is "ON", the light from the light source 61 is reflected in the direction toward the first coaxial optical system 70 (See FIG. 3) indicated by arrow L2 in FIG. 5. When the micro mirror is "OFF", the light from the light source 61 is reflected in the direction of an OFF light plate 27 (See FIG. 8) indicated by arrow L1 in FIG. 5. By driving each micro mirror individually, projection of light with respect to each pixel in the image data is controlled to generate the image to be projected as the projection image P.

Figure 6:
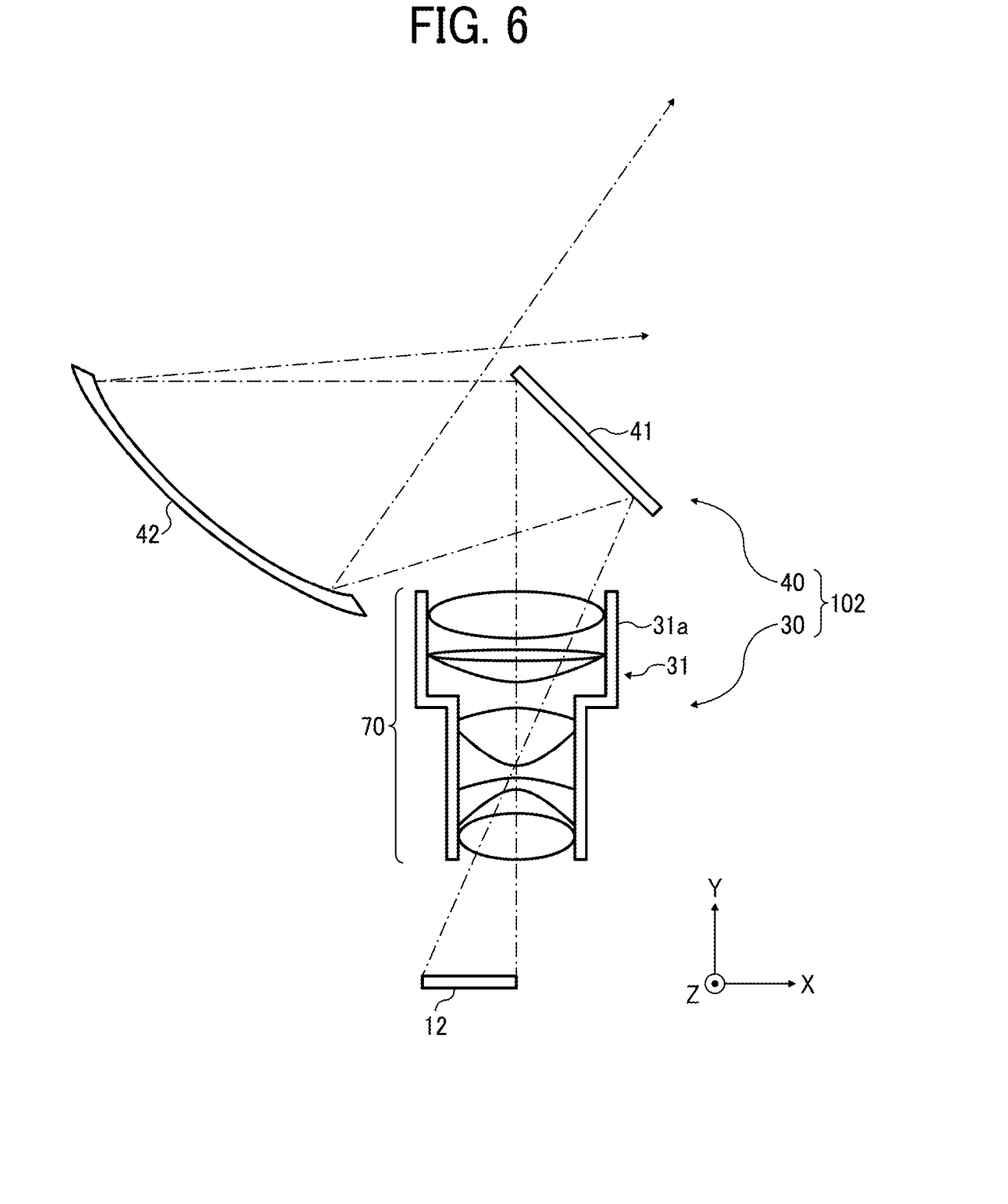
FIG. 6 is a diagram showing a light path within a projection optical unit.

FIG. 6 is a diagram showing a light path within the projection optical unit 102.

The projection optical unit 102 includes the first projection optical unit 30, and the second projection optical unit 40. The first projection optical unit 30 includes a projection optical component 31 of the first coaxial optical system 70 configured of multiple lenses. The second projection optical unit 40 includes the reflection mirror 41 and the curved-face mirror 42. A face of the curved-face mirror 42 that reflects light may be a spherical-face shape, a rotationally-symmetric aspherical-face shape, or a free-form curved-face shape.

The light flux passing through the projection optical component 31 configuring the first coaxial optical system 70 forms an intermediate image, between the reflection mirror 41 and the curved-face mirror 42, serving as a conjugate image with the image generated at the DMD 12. The intermediate image is formed as a curved-face image between the reflection mirror 41 and the curved-face mirror 42. The light flux after formation of the intermediate image enters a concave-face of the curved-face mirror 42 and becomes a converged light flux. Accordingly, due to the curved-face mirror 42, the intermediate image is further magnified to form the projection image P of larger size on the projection plane 2.

By configuring the projection optical unit 102 in the above-described manner including the first coaxial optical system 70 and multiple mirrors configuring a second optical system, forming the intermediate image between the first coaxial optical system 70 and the curved-face mirror 42 of the second optical system, and further magnifying and projecting the projection image P with the curved-face mirror 42, projection distance of the projection space is shortened. Accordingly, the projector 1 may be employed in a small meeting room.

Figure 7:
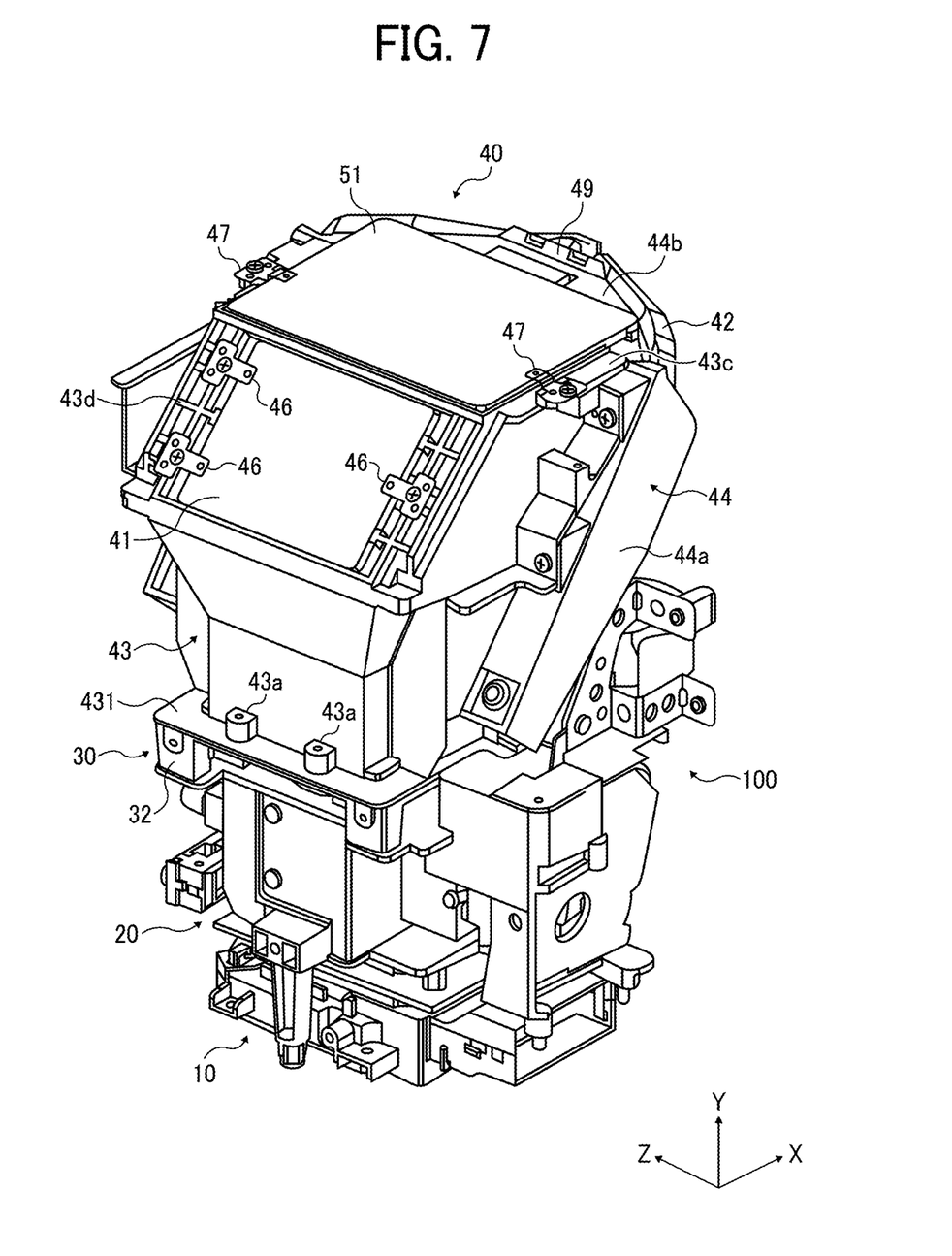
FIG. 7 is a perspective view of an optical engine.

FIG. 7 is a perspective view of the optical engine 100.

As illustrated in FIG. 7, the second projection optical unit 40 includes a mirror supporting member 43 to support the reflection mirror 41 and the dust-proof glass 51. The second projection optical unit 40 further includes a free-form mirror supporting member 44 to support the curved-face mirror 42. The free-form mirror supporting member 44 is attached to the mirror supporting member 43.

The mirror supporting member 43 is formed of a resin material and has a box-like shape. A lower plane and a back side in the X-direction of FIG. 7 of the mirror supporting member 43 are open. An upper surface of the mirror supporting member 43 is formed of a sloped face 43d and a horizontal face 43c. The sloped face 43d is sloped upward, from an edge portion at a front side towards the back side, in the X-direction of FIG. 7. The horizontal face 43c is parallel to the X-direction in FIG. 7. The sloped face 43d is provided in front of the X-direction of the horizontal face 43c. The sloped face 43d and the horizontal face 43c each include an opening. The reflection mirror 41 is provided on the sloped face 43d so as to cover the opening of the sloped face 43d. The dust-proof glass 51 is provided on the horizontal face 43c so as to close the opening of the horizontal face 43c.

By forming the mirror supporting member 43 with the resin material, the mirror supporting member 43 may be manufactured at a lower cost compared to forming the mirror supporting member 43 with a metal material. In addition, weight reduction of the projector 1 is achieved.

The reflection mirror 41 is held at the position at the sloped face 43d of the mirror supporting member 43, with the mirror pressing member 46 having a flat spring shape that presses the Z-direction ends of the reflection mirror 41 against, the sloped face 43d of the mirror supporting member 43. The reflection mirror 41 has one end in the Z direction fixed by two mirror pressing members 46 and the other end in the Z-direction fixed by one mirror pressing member 46.

The dust-proof glass 51 is fixed at the mirror supporting member 43, with a glass pressing member 47. The glass pressing member 47 having a flat spring shape that presses the Z-direction ends of the dust-proof glass 51 against the horizontal face 43c of the mirror supporting member 43. The dust-proof glass 51 is held by one glass pressing member 47 at each end in the Z-direction.

The free-form mirror supporting member 44 that supports the curved-face mirror 42 includes an arm 44a that is sloped downward from the back side to the front side in the X-direction, at each of the front side and back side in the Z-direction. In addition, the free-form mirror supporting member 44 includes a connection member 44b that connects the two arms 44a at an upper portion of each of the two arms 44a. The two arms 44a of the free-form mirror supporting member 44 are fixed to the mirror supporting member 43 so as to cover the opening of the back side in the X-direction of the mirror supporting member 43 with the curved-face mirror 42.

An upper end of the curved-face mirror 42 and a center portion of an edge of the dust-proof glass 51 are pressed against the connection member 44b of the free-form mirror supporting member 44 with a free-form mirror pressing member 49 having a flat spring shape. The Z-direction ends of the two arms 44a of the free-form mirror supporting member 44 are fixed with screws at the first coaxial optical system 70 side of the curved-face mirror 42.

The second projection optical unit 40 is mounted and fixed to a fitting member 32 of the first projection optical unit 30. More specifically, the mirror supporting member 43 has a backside face 431 at a lower portion, which faces an upper face of the fitting member 32. The backside face 431 has four cylindrical shaped screw fastening members 43a, which are formed thereon, to fasten the mirror supporting member 43 to the first projection optical unit 30. In FIG. 7, two of the four cylindrical shaped screw fastening members 43a are shown.

Figure 8:
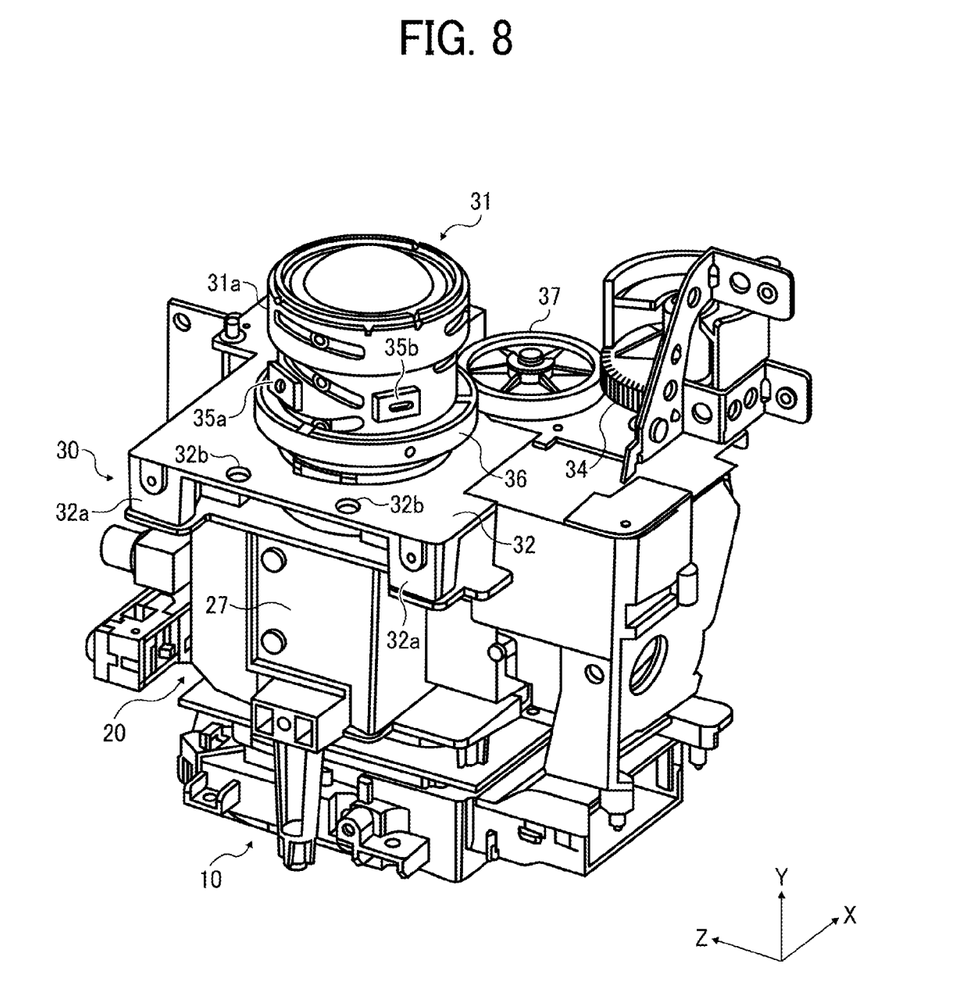
FIG. 8 is a perspective view of the illumination unit, a first projection optical unit, and a light modulator.

FIG. 8 is a perspective view of the illumination unit 20, the first projection optical unit 30, and the light modulator 10.

The first projection optical unit 30 is disposed above the illumination unit 20. The fitting member 32 is fitted to a barrel member 31a supporting multiple lenses configuring the first coaxial optical system 70 of the projection optical component 31. More specifically, a through hole is formed approximately at a center portion of the fitting member 32, through which the projection optical component 31 is inserted.

Four legs 32a extending downwards are provided, respectively, at the four corners of the backside of the fitting member 32. At a bottom face of each of the four legs 32a, a screw hole is formed for fastening to the illumination unit 20.

At four corners of an upper surface of a housing of the illumination unit 20, holes to which screws pass through are provided, respectively, to fasten the first projection optical unit 30. By inserting screws into the holes and fastening the screws to the screw holes provided at the bottom face of the four legs 32a, the first projection optical unit 30 is fastened to the illumination unit 20.

A first position-arrangement member 35a and a second position-arrangement member 35b, to position the mirror supporting member 43 of the second projection optical unit 40, are provided at the barrel member 31a of the projection optical component 31. At a center of the first position-arrangement member 35a, a main position-arrangement hole having a circular hole shape is formed as a main position-arrangement reference. At a center of the second position-arrangement member 35b, a sub-position-arrangement hole having a rectangular hole shape is formed as a sub-position-arrangement reference.

The fitting member 32 includes four screw holes 32b through which screws pass, which fasten the second projection optical unit 40 to the first projection optical unit 30. In FIG. 8, two of the four screw holes 32b are shown.

The projection optical component 31 includes a focus gear 36. The focus gear 36 engages an idler gear 37. The idler gear 37 engages a lever gear 34. A rotary shaft of the lever gear 34 is fixed to the focus lever 33. A tip end portion of the focus lever 33 is exposed outside of the main body cover of the projector 1 as illustrated in FIG. 1.

When the focus lever 33 is moved, the focus gear 36 rotates via the lever gear 34 and the idler gear 37. When the focus gear 36 rotates, the multiple lenses configuring the first coaxial optical system 70 of the projection optical component 31 move in predetermined directions and focus of the projected projection image P is adjusted.

Figure 9:
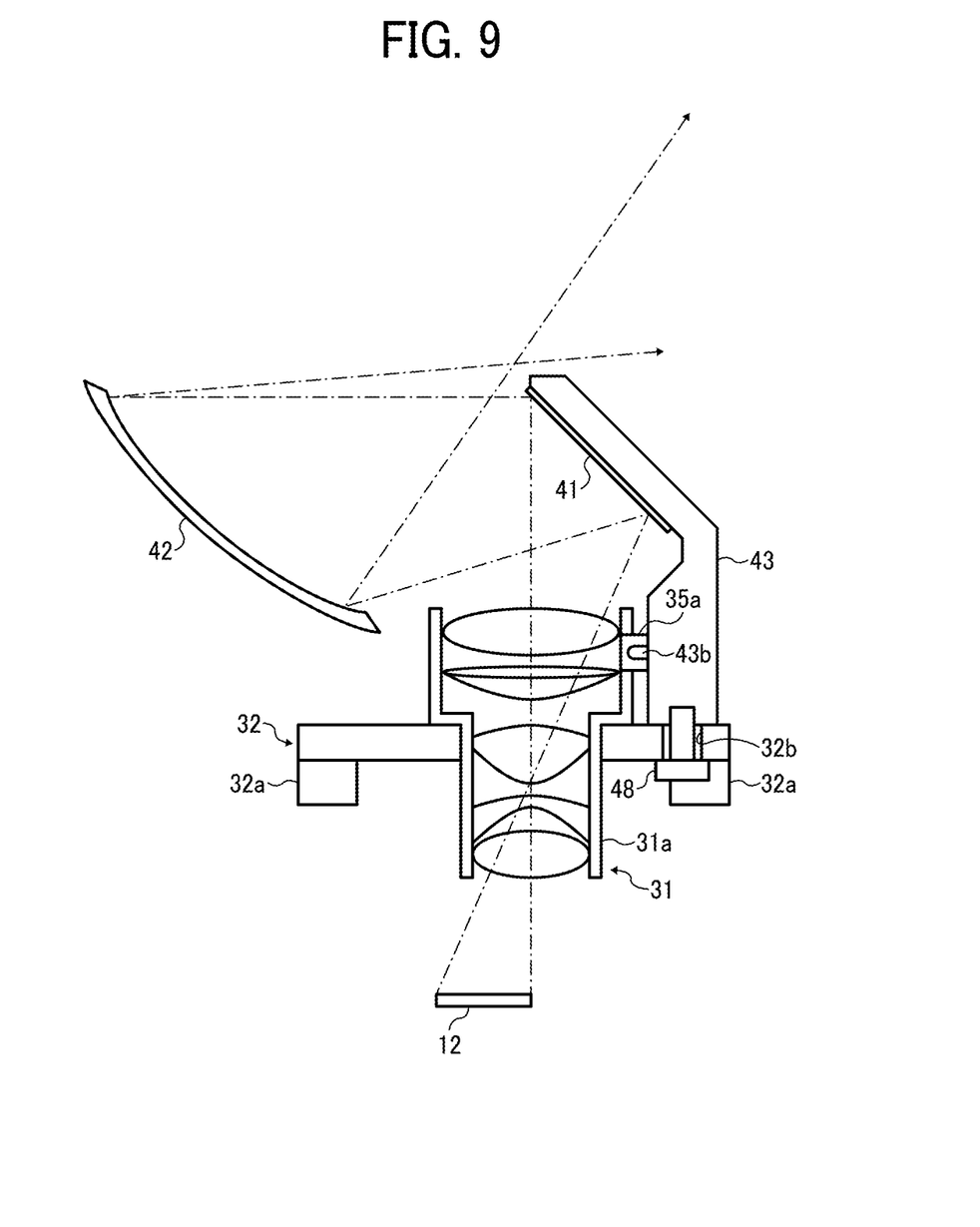
FIG. 9 is a cross-section of the first projection optical unit and a second projection optical unit.

FIG. 9 is a cross-section of the first projection optical unit 30 and the second projection optical unit 40.

As illustrated in FIG. 9, two position-arrangement pins 43b are provided at opposing faces of the mirror supporting member 43 and the projection optical component 31. The two position-arrangement pins 43b are inserted to the main position-arrangement hole of the first position-arrangement member 35a and the sub-position-arrangement hole of the second position-arrangement member 35b provided at the barrel member 31a of the projection optical component 31 as illustrated in FIG. 8, respectively.

After being inserted, the mirror supporting member 43 is screwed to the fitting member 32 of the first projection optical unit 30. More specifically, after inserting screws 48 to the four screw holes 32b provided in the fitting member 32 and fastening the screws 48 to the four cylindrical shaped screw fastening members 43a, the mirror supporting member 43 is fixed to the fitting member 32. By fixing the mirror supporting member 43 to the fitting member 32, the second projection optical unit 40 is fixed to the first projection optical unit 30.

Figure 10:
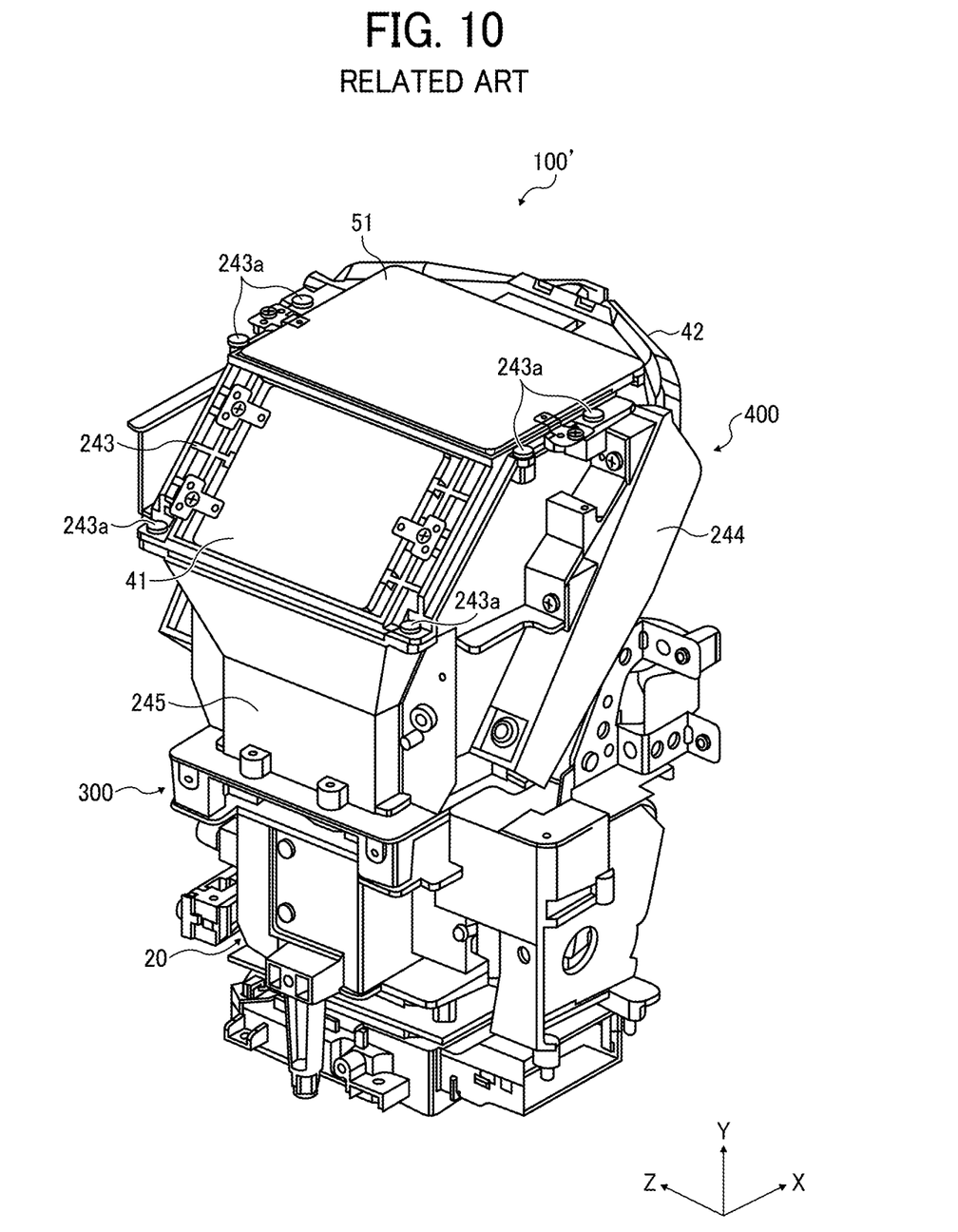
FIG. 10 is a perspective view of an optical engine of a conventional projector.
Figure 11:
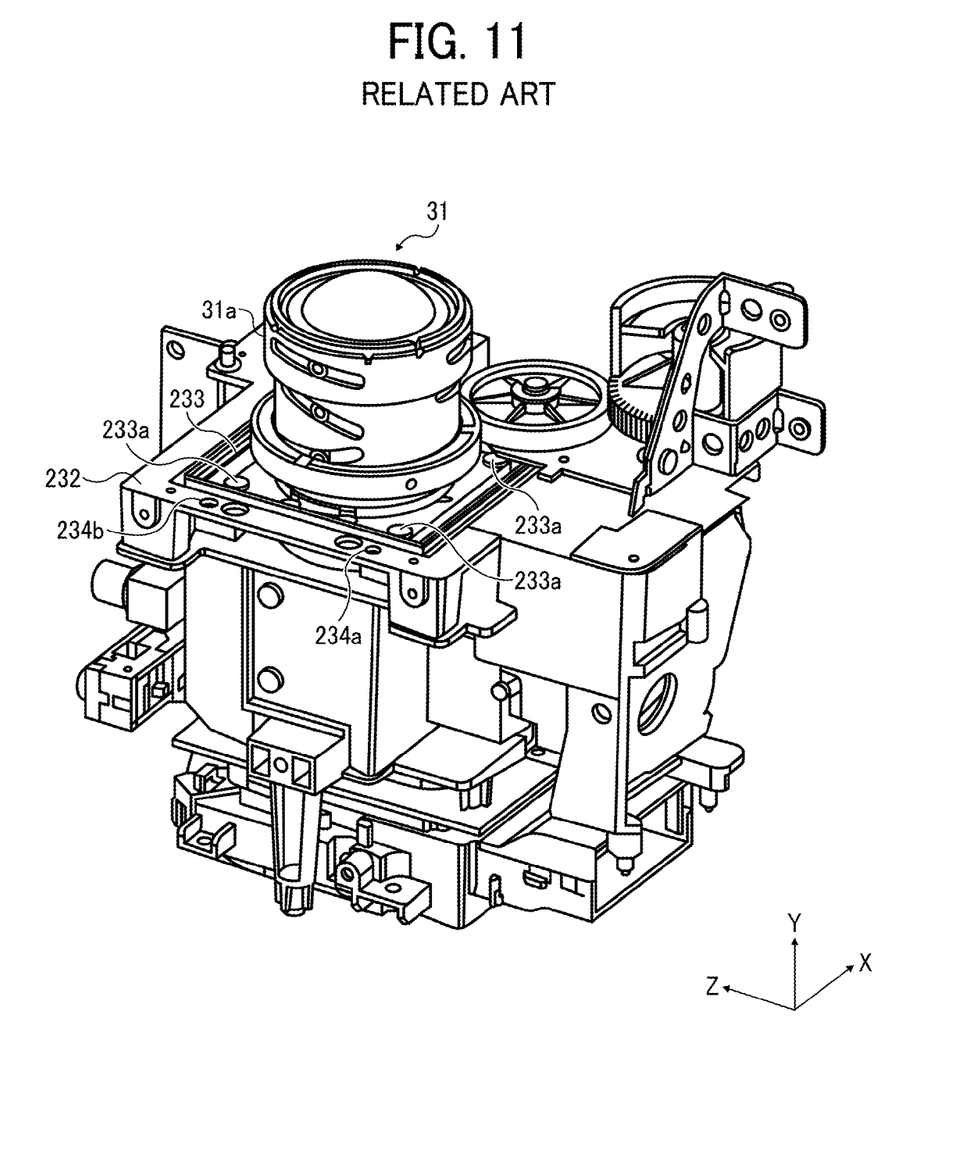
FIG. 11 is a perspective view of an illumination unit, a first projection optical unit, and a light modulator of the conventional projector.

FIG. 10 is a perspective view of an optical engine 100' of a conventional projector, serving as a comparative example. FIG. 11 is a perspective view of an illumination unit 20, a first projection optical unit 30, and a light modulator 10 of the conventional projector, as a comparative example.

As illustrated in FIG. 10, a second projection optical unit 400 includes a mirror bracket 245, a mirror supporting member 243 to support a reflection mirror 41 and a dust-proof glass 51, and a free-form mirror supporting member 244 to support a curved-face mirror 42. The mirror supporting member 243 is fixed to an upper portion of the mirror bracket 245 with screws 243a. The free-form mirror supporting member 244 is also arranged and fixed to the mirror bracket 245.

Conventionally, a fitting member 233, to which a projection optical component 31 is fitted, is fixed to a lens bracket 232 with screws 233a as illustrated in FIG. 11. The lens bracket 232 is fastened to the upper surface of the illumination unit 20 with screws. Accordingly, the first projection optical unit 30 is fixed to the illumination unit 20. Position-arrangement holes 234a and 234b are provided in the lens bracket 232 to arrange the mirror bracket 245. At a back side of the mirror bracket 245, two position-arrangement protrusions are provided. The two position-arrangement protrusions are inserted into the position-arrangement holes 234a and 234b, respectively, to arrange the mirror bracket 245 with respect to the lens bracket 232. Thus, the mirror bracket 245 is arranged with respect to the lens bracket 232. By fixing the mirror bracket 245 to the lens bracket 232, the second projection optical unit 400 is arranged and fixed to the first projection optical unit 30.

As described above, conventionally, in between the projection optical component 31 and the reflection mirror 41, there are four parts that are the fitting member 233, the lens bracket 232, the mirror bracket 245, and the mirror supporting member 243. As a result, accumulation of manufacturing errors of the four parts occurs between the projection optical component 31 and the reflection mirror 41. In addition, there is a possibility of generating assembly errors between the projection optical component 31 and the fitting member 233, between the lens bracket 232 and the fitting member 233, between the mirror supporting member 243 and the mirror bracket 245, and between the reflection mirror 41 and the mirror supporting member 243. As a result, there is a possibility of an occurrence of arrangement of the reflection mirror 41 with respect to the projection optical component 31 largely deviating from a pre-defined arrangement. This deviation may lead to the generation of trapezoidal distortion of a projection image or the generation of vignetting.

By contrast, in the embodiment of the present invention shown in FIG. 9, the mirror supporting member 43 that supports the reflection mirror 41 is arranged to the projection optical component 31. Accordingly, in between the projection optical component 31 and the reflection mirror 41, there is one part that is the mirror supporting member 43. As a result, factors that may lead to arrangement deviation of the reflection mirror 41 with respect to the projection optical component 31 are two factors. The two factors are manufacturing error of the mirror supporting member 43 and assembly error of the mirror supporting member 43 and the reflection mirror 41. Therefore, compared to the conventional configuration, the embodiment of the present invention suppresses arrangement deviation of the reflection mirror 41 with respect to the projection optical component 31, and suppresses the generation of trapezoidal distortion of the projection image P or the generation of vignetting.

In addition, in the embodiment of the present invention, the mirror supporting member 43 is fixed to the fitting member 32. Reasons of fixing the mirror supporting member 43 to the fitting member 32 are as follows. As illustrated in FIG. 8, points that support the multiple lenses of the barrel member 31a of the projection optical component 31, are rectangular holes extending in slanting directions. As described above, this is to enable movement, in predetermined directions, of the multiple lenses configuring the first coaxial optical system 70 to adjust focus. Accordingly, securing a point to fix the mirror supporting member 43 is difficult due to the barrel member 31a having rectangular holes to support the multiple lenses configuring the first coaxial optical system 70, the first position-arrangement member 35a, and the second position-arrangement member 35b. Even if the point to fix the mirror supporting member 43 is secured on the barrel member 31a, fixing balance is not good and there is a possibility of the mirror supporting member 43 rotating around a Z-axis or an X-axis.

Thus, in the embodiment of the present invention, the mirror supporting member 43 is mounted on the upper surface, perpendicular to the Y-direction, of the fitting member 32 and fixed to the fitting member 32. Thus, a stable fixing of the mirror supporting member 43 is obtained. Accordingly, inhibition of the mirror supporting member 43 rotating around the Z-axis or the X-axis is obtained.

In the conventional configuration, the free-form mirror supporting member 244 supporting the curved-face mirror 42 and the mirror supporting member 243 supporting the reflection mirror 41 are fixed to the mirror bracket 245. Accordingly, in between the curved-face mirror 42 and the reflection mirror 41, there are three parts that are the mirror supporting member 243, the mirror bracket 245, and the free-form mirror supporting member 244. As a result, accumulation of manufacturing errors of the three parts occurs between the curved-face mirror 42 and the reflection mirror 41. In addition, there is a possibility of generating assembly errors between the mirror supporting member 243 and the reflection mirror 41, between the mirror bracket 245 and the mirror supporting member 243, between the free-form mirror supporting member 244 and the mirror bracket 245, and between the curved-face mirror 42 and the free-form mirror supporting member 244. In other words, conventionally, there are a total of seven factors, manufacturing errors of the three parts and four assembly errors, that may lead to arrangement deviation of the curved-face mirror 42 with respect to the reflection mirror 41.

By contrast, in the embodiment of the present invention, the free-form mirror supporting member 44 is fixed to the mirror supporting member 43. Accordingly, parts in between the curved-face mirror 42 and the reflection mirror 41 are reduced to two parts that are the mirror supporting member 43 and the free-form mirror supporting member 44. Accordingly, factors that may lead to arrangement deviation of the curved-face mirror 42 with respect to the reflection mirror 41 are reduced to the following five factors. The five factors are manufacturing errors of the two parts that are the mirror supporting member 43 and the free-form mirror supporting member 44, and the following three assembly errors. The three assembly errors are assembly errors between the mirror supporting member 43 and the reflection mirror 41, between the free-form mirror supporting member 44 and the mirror supporting member 43, and between the curved-face mirror 42 and the free-form mirror supporting member 44.

Therefore, compared to the conventional configuration of FIG. 10 and FIG. 11, the embodiment of the present invention reduces possibility of arrangement deviation due to accumulation of manufacturing errors of parts between the reflection mirror 41 and the curved-face mirror 42, and assembly errors of parts between the reflection mirror 41 and the curved-face mirror 42. Accordingly, possibility of arrangement deviation of the reflection mirror 41 with respect to the projection optical component 31 is suppressed, and the generation of trapezoidal distortion of the projection image P or the generation of vignetting is suppressed.

In addition, by fixing the mirror supporting member 43 to the first projection optical unit 30 and fixing the free-form mirror supporting member 44 to the mirror supporting member 43, the mirror bracket 245 is removed. Thus, compared to the conventional configuration of FIG. 10 and FIG. 11, the number of parts is reduced and reduction of cost of the projector 1 is obtained.

In the conventional configuration, the projection optical component 31 is fixed to the illumination unit 20 via the fitting member 233 and the lens bracket 232. Thus, in between the projection optical component 31 and the illumination unit 20, there are two parts of the fitting member 233 and the lens bracket 232. As a result, accumulation of manufacturing errors of the fitting member 233 and the lens bracket 232 occurs between the projection optical component 31 and the illumination unit 20. In addition, there is a possibility of generating three assembly errors. The three assembly errors are between the fitting member 233 and the projection optical component 31, between the lens bracket 232 and the fitting member 233, and between the illumination unit 20 and the lens bracket 232. Therefore, in the conventional configuration, manufacturing errors of the two parts and possible three assembly errors accumulate between the projection optical component 31 and the illumination unit 20.

By contrast, in the embodiment of the present invention, the lens bracket 232 is removed, and the fitting member 32 is fixed to the illumination unit 20. Thus, in between the projection optical component 31 and the illumination unit 20, there is one part that is the fitting member 32. As a result, factors that may lead to arrangement deviation between the projection optical component 31 and the illumination unit 20 are manufacturing error of the fitting member 32, assembly error between the fitting member 32 and the projection optical component 31, and assembly error between the illumination unit 20 and the fitting member 32. Accordingly, possibility of arrangement deviation of the projection optical component 31 with respect to the illumination unit 20 is suppressed, and possibility of arrangement deviation between the projection optical component 31 and the DMD 12 fixed to the illumination unit 20 is suppressed.

In addition, by removing the lens bracket 232, the number of parts are reduced, and reduction of cost of the projector 1 compared to the conventional configuration is obtained.

In the above-described embodiment of the present invention, the reflection mirror 41 is arranged with respect to the barrel member 31a of the projection optical component 31 via the mirror supporting member 43. However, a configuration of directly arranging the reflection mirror 41 with respect to the barrel member 31a is also possible. With the configuration, further suppression of arrangement deviation between the projection optical component 31 and the reflection mirror 41 is obtained.

The description thus far is one example of an embodiment of the present invention. Each aspect of the present invention exhibits particular effects as follows.

[Aspect 1]

The projection optical device includes the position-arrangement member (i.e., the first position-arrangement member 35a and the second position-arrangement member 35b in the above-described embodiment) provided at a projection lens supporting member such as the barrel member 31a. The projection lens supporting member supports a plurality of projection lenses. The position-arrangement member arranges the reflection mirror 41 to a predefined position on the projection lens supporting member. The projection optical device such as the projection optical unit 102 projects, via the plurality of projection lenses such as the first coaxial optical system 70 and the reflection mirror 41, the image to be projected as the projection image P formed with an image generating component such as the light modulator 10 on to the projection plane 2.

With aspect 1, the reflection mirror 41 is arranged by the projection optical component 31. Accordingly, compared to the conventional configuration, parts in between the projection optical component 31 and the reflection mirror 41 are reduced. Thus, accumulation of manufacturing errors of parts are reduced, and accumulation of assembly errors between each of the parts are reduced. As a result, arrangement deviation of the reflection mirror 41 with respect to the projection optical component 31 is suppressed. Accordingly, the generation of trapezoidal distortion of the projection image P projected on the projection plane 2 or the generation of vignetting is suppressed.

[Aspect 2]

The projection optical device of aspect 1 further including the mirror supporting member 43 to support the reflection mirror 41. The position-arrangement member arranges the reflection mirror 41 via the mirror supporting member 43.

With aspect 2, in between the mirror supporting member 43 and the reflection mirror 41, there is one part that is the mirror supporting member 43. As a result, compared to the conventional configuration having multiple parts in between the mirror supporting member 43 and the reflection mirror 41, arrangement deviation of the reflection mirror 41 with respect to the projection optical component 31 is suppressed. Accordingly, the generation of trapezoidal distortion of the projection image P projected on the projection plane 2 or the generation of vignetting is suppressed.

[Aspect 3]

The projection optical device of aspect 1 in which the fitting member 32 is attached to a member (i.e., the illumination unit 20 in the embodiment of the present invention) to which the image generating component such as the light modulator 10 is fixed. The fitting member 32 is fitted with the projection lens supporting member such as the barrel member 31a.

With the configuration of aspect 3, the number of parts is reduced compared to the conventional configuration in which the lens bracket 232 is attached to the illumination unit 20. The lens bracket 232 is attached with the fitting member 32. Accordingly, reduction of cost of the projector 1 is obtained. In addition, accumulation of manufacturing errors and assembly errors are reduced and arrangement deviation of the projection optical component 31 with respect to the DMD 12 is suppressed.

[Aspect 4]

The projection optical device of aspect 3 in which the mirror supporting member 43 to support the reflection mirror 41 is fixed to the fitting member 32.

With the configuration of aspect 4, as described above in the embodiment of the present invention, stable fixing of the mirror supporting member 43 is obtained compared to fixing the mirror supporting member 43 to the projection optical component 31.

[Aspect 5]

The projection optical device of aspect 1 in which the mirror supporting member 43 to support the reflection mirror 41 includes a resin material.

With the configuration of aspect 5, as described above in the embodiment of the present invention, the mirror supporting member 43 may be manufactured at a lower cost compared to forming the mirror supporting member 43 with a metal material. In addition, weight reduction of the projector 1 is obtained compared to forming the mirror supporting member 43 with the metal material. [Aspect 6]

The image projection apparatus such as the projector 1 includes the light source 61 to emit light, the image generating component such as the light modulator 10 to generate the image to be projected as the projection image P with the light from the light source 61, an illumination device such as the illumination unit 20 to guide the light from the light source 61 to the image generating component, and the projection optical device of aspect 1 such as the projection optical unit 102 (e.g., the projection optical component 31, the reflection mirror 41, and curved-face mirror 42 included in the embodiment of the present invention) to project the projection image P on the projection plane 2.

With aspect 6, the generation of trapezoidal distortion of the projection image P or the generation vignetting is suppressed. Accordingly, a good projection image P is projected to the projection plane 2.

What is claimed is:

1. A projection optical device to project an image on a projection plane, comprising:
   a reflection mirror;
   a mirror supporting member configured to support the reflection mirror;
   a plurality of projection lenses; and
   a barrel member that is separate from the mirror supporting member, such that the reflection mirror and the mirror supporting member are external to the barrel member, the barrel member configured to directly support each lens of the plurality of projection lenses within an interior of the barrel member, the barrel member including a position-arrangement member on an exterior of the barrel member, the position-arrangement member configured to directly couple the exterior of the barrel member to the mirror supporting member, such that
   the mirror supporting member is directly coupled to both the reflection mirror and the exterior of the barrel member, and
   the reflection mirror is positioned at a particular position on the barrel member.

2. The projection optical device of claim 1, further comprising:
   a fitting member attached to a member to which an image generating component is fixed and fitted with the barrel member.

3. The projection optical device of claim 2, wherein the mirror supporting member configured to support the reflection mirror is fixed to the fitting member.

4. The projection optical device of claim 1, wherein the mirror supporting member configured to support the reflection mirror includes a resin material.

5. An image projection apparatus, comprising:
   a light source to emit light;
   an image generating component configured to generate an image with the light emitted from the light source;
   an illumination device configured to guide the light from the light source to the image generating component; and
   a projection optical device configured to project the image generated by the image generating component on the projection plane, wherein the projection optical device includes,
   a reflection mirror;
   a mirror supporting member configured to support the reflection mirror;
   a plurality of projection lenses; and
   a barrel member that is separate from the mirror supporting member, such that the reflection mirror and the mirror supporting member are external to the barrel member, the barrel member configured to directly support each lens of the plurality of projection lenses within an interior of the barrel member, the barrel member including a position-arrangement member on an exterior of the barrel member, the position-arrangement member configured to directly couple the exterior of the barrel member to the mirror supporting member, such that
   the mirror supporting member is directly coupled to both the reflection mirror and the exterior of the barrel member, and
   the reflection mirror is positioned at a particular position on the barrel member.

6. The image projection apparatus of claim 5, wherein the projection optical device further includes a fitting member attached to a member to which the image generating component is fixed and fitted with the barrel member.

7. A method, comprising:
   coupling a reflection mirror to a mirror supporting member; and directly coupling a barrel member to the mirror supporting member through a position-arrangement member on an exterior of the barrel member, such that,
- the mirror supporting member is directly coupled to both the reflection mirror and the exterior of the barrel member, and
- the reflection mirror is positioned at a particular position on the barrel member;

wherein the barrel member is separate from the mirror supporting member, such that the reflection mirror and the mirror supporting member are external to the barrel member, and the barrel member is configured to directly support each lens of a plurality of projection lenses within an interior of the barrel member.

8. The method of claim 7, further comprising:
coupling a fitting member to an image generating component; and
coupling the fitting member to the barrel member.

9. The method of claim 8, further comprising:
coupling the mirror supporting member to the fitting member.

10. The method of claim 7, wherein the mirror supporting member includes a resin material.

\* \* \* \* \*